United States Patent [19]
von Wiesenthal

[11] 3,897,194
[45] July 29, 1975

[54] METHOD FOR VAPORIZING A SENSITIVE LIQUID

[75] Inventor: Peter von Wiesenthal, New York, N.Y.

[73] Assignee: Heat Research Corporation, New York, N.Y.

[22] Filed: Apr. 18, 1974

[21] Appl. No.: 462,049

[52] U.S. Cl. ................................. 431/11; 165/107
[51] Int. Cl. ........................................... F23d 11/44
[58] Field of Search ................ 165/107; 122/33, 28; 431/11; 126/350

[56] References Cited
FOREIGN PATENTS OR APPLICATIONS
1,079,137   8/1967   United Kingdom ................. 165/107
821,003   9/1959   United Kingdom ................. 165/107
1,242,727   8/1960   France ................................ 165/107

Primary Examiner—Edward G. Favors
Attorney, Agent, or Firm—Charles E. Baxley

[57] ABSTRACT

This disclosure teaches a method of vaporizing a sensitive liquid such as liquified natural gas. The liquid to be vaporized is passed through a heat exchanger in noncontact heat exchange relationship with a heat transfer medium. The medium is heated in a tower flowing downwardly through trays or packing in direct contact with upflowing hot combustion gases. The combustion gases preferably are generated in a combustor spaced from the tower.

1 Claim, 3 Drawing Figures

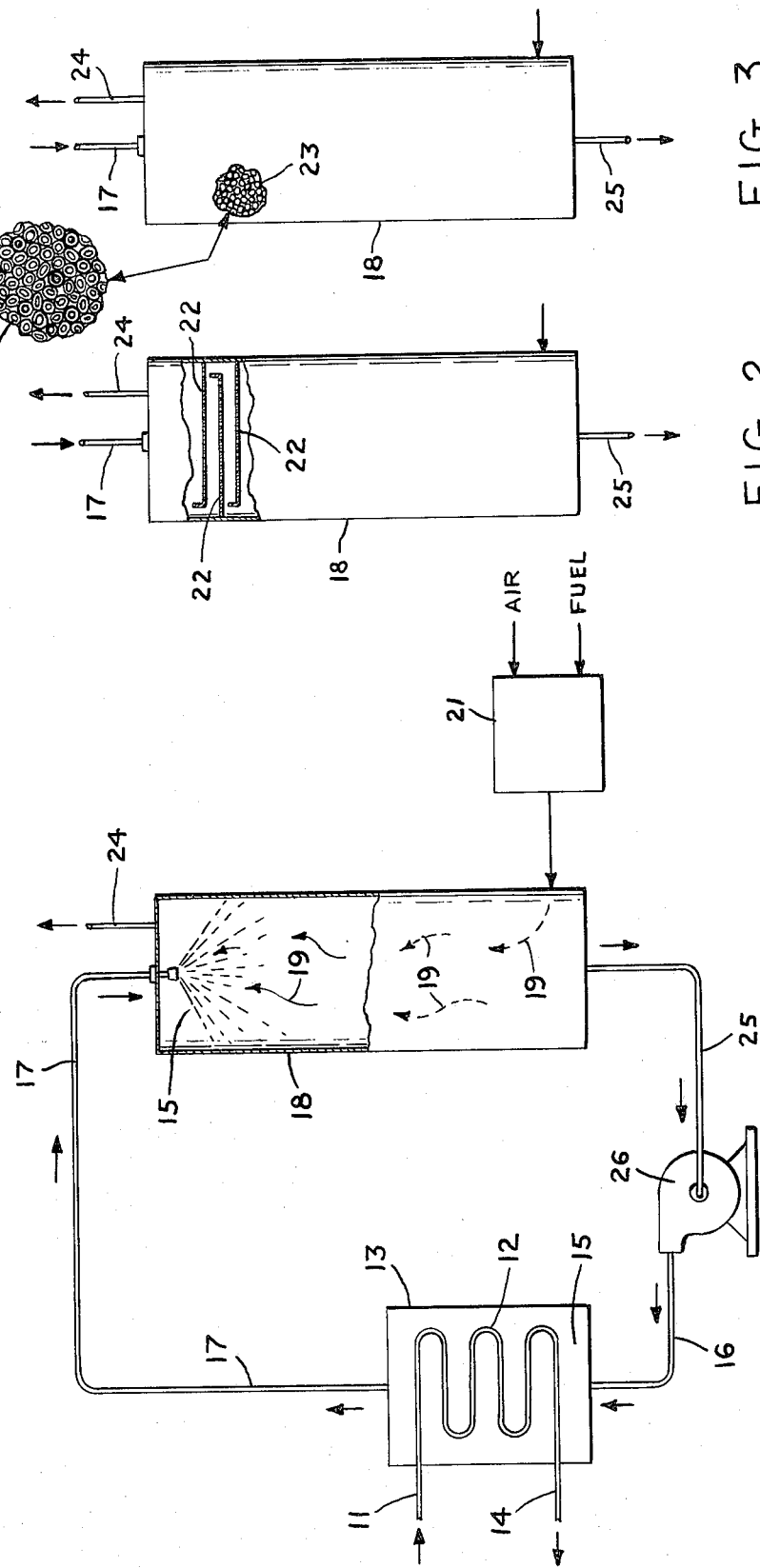

METHOD FOR VAPORIZING A SENSITIVE LIQUID

BACKGROUND OF INVENTION

This invention relates to vaporizing of a sensitive liquid, for example liquified natural gas. There are several current approaches to such vaporizing of sensitive liquids, including use of direct fired furnaces, submerged combustion, ambient water heating and heating media loops.

Vaporizing in tubes of direct fired furnaces is hazardous in that rupture of a tube could result in an explosion.

In submerged combustion the fluid to be vaporized is passed through a coil immersed in a water bath, while a burner discharges hot combustion products into the water bath. Submerged combustion necessitates a burner that operates while submerged and also operates against an appreciable pressure.

In ambient water heating the liquid to be vaporized is passed through a heat exchanger for heat exchange with large quantities of ambient water. Such heating by use of ambient water requires handling of large quantities of the water and it has an added disadvantage in being susceptible for ice formation, if the ambient water is at low temperature.

In heating media loops of the prior art the liquid is vaporized in a heat exchanger wherein it absorbs heat from a circulating heat transfer medium. But the heat transfer medium in turn is heated in a furnace with attendant complexities.

STATEMENT OF INVENTION

Problems of the prior art have been solved here by a useful, novel, unobvious and facile approach. The sensitive liquid to be vaporized is passed through a heat exchanger in noncontact heat exchange relationship with a heat transfer medium. The medium is heated in a tower in direct contact with combustion gases. The combustion gases preferably are generated in a combustor spaced from the tower.

Accordingly one object of this invention is to permit use of a small heat exchanger.

Another object of this invention is to facilitate structural requirements of the tower and the combustor.

Still another object of this invention is to allow for efficient operation through a wide range of throughputs by varying flow rate and temperature of the heat transfer medium.

Still another object of this invention is to take advantage of rapid and efficient heat transfer from the hot combustion gases to the heat transfer medium in the tower.

Still another object of this invention is to separate hot combustion gases from contact with the vaporizing sensitive liquid, in the event the heat exchanger should leak; thereby eliminating an explosion hazard.

Still another object of this invention is to provide for economic operation of burners because they do not have to fire submerged against a back pressure, as would be the case in submerged combustion.

Still another object of this invention is to provide equipment of the character stated which is economic to build and maintain and is well suited otherwise to its intended function.

DRAWING

The foregoing and other objects, features and advantages will be understood more fully from a detailed description of a preferred embodiment of the invention which follows and from claims which follow all viewed in conjunction with an accompanying drawing wherein:

FIG. 1 is a schematic view of a system adapted to carry out the method of this invention.

FIG. 2 is a detailed view of trays mounted in the tower.

FIG. 3 is a detailed view of packing rings in the tower.

DESCRIPTION OF PREFERRED EMBODIMENTS

As best seen in FIG. 1, a liquid to be vaporized is fed via a line 11 through a coil 12 in a heat exchanger 13 from whence it exits via a line 14. In the heat exchanger 13 the liquid is passed via the coil 12 in noncontact heat exchange relationship with a heat transfer medium 15 on the shell side which enters via a line 16 and exits via another line 17.

The cooled heat transfer medium 15 is heated in a tower 18 by direct contact with hot combustion gases 19 generated in a combustor 21. The hot combustion gases 19 pass upwardly through the tower 18 which may be provided with trays 22 as shown in FIG. 2 or with packing rings 23 as shown in FIG. 3, or alternately the tower 18 may be operated empty. The combustion gases exit via a line 24 and the heated medium 15 exits via the bottom of the tower 18 through a line 25. The medium 15 may be circulated by means of a pump 26 located between the tower 18 and the heat exchanger 13 or it may be circulated otherwise between the tower 18 and the heat exchanger 13.

An important feature of this invention is to isolate the hot combustion gases 19 from the liquid being vaporized in the coil 12. Toward this objective the hot combustion gases 19 are circulated through the tower 18 and the liquid to be vaporized is circulated throught the coil 12 in the heat exchanger 13. Only the heat transfer medium 15 is circulated to the shell side of the heat exchanger 13 so that isolation of the liquid being vaporized in the coil 12 from the hot combustion gases 19 in the tower 18 is assured. The hot combustion gases 19 preferably are generated in the combustor 21 which is provided with a fuel supply 27 and an air supply 28 and which is separated via a duct 29 from the tower 18.

It will be apparent to those skilled in heat transfer that wide deviations may be made from the shown preferred embodiments without departing from claims which follow.

I claim:

1. A method of vaporizing liquified natural gas and comprising steps as follows:

passing the liquified natural gas through a heat exchanger in noncontact heat exchange relationship with a liquid heat transfer medium in counterflow heat exchange relationship therewith to vaporize the natural gas thereby cooling the medium, circulating the cooled medium downwardly through a tower spaced from the heat exchanger so that the cooled medium passes in direct heat exchange relationship with hot combustion gases passing upwardly therethrough, enlarging surface area of the medium in the tower to increase the heat exchange thereto, burning a fuel in a combustor spaced from the vessel to produce the hot combustion gases.

* * * * *